June 27, 1944. J. H. CAMPBELL Re. 22,503

CIRCUIT FOR ELECTRIC DISCHARGE DEVICES

Original Filed Oct. 5, 1939

Inventor:
John H. Campbell,
by Harry E. Dunham
His Attorney.

Reissued June 27, 1944

Re. 22,503

UNITED STATES PATENT OFFICE 22,503

CIRCUIT FOR ELECTRIC DISCHARGE DEVICES

John H. Campbell, Cleveland Heights, Ohio, assignor to General Electric Company, a corporation of New York Original No. 2,266,619, dated December 16, 1941, Serial No. 298,082, October 5, 1939. Application for reissue August 27, 1942, Serial No. 456,381

9 Claims. (Cl. 315—100)

Figure 1:
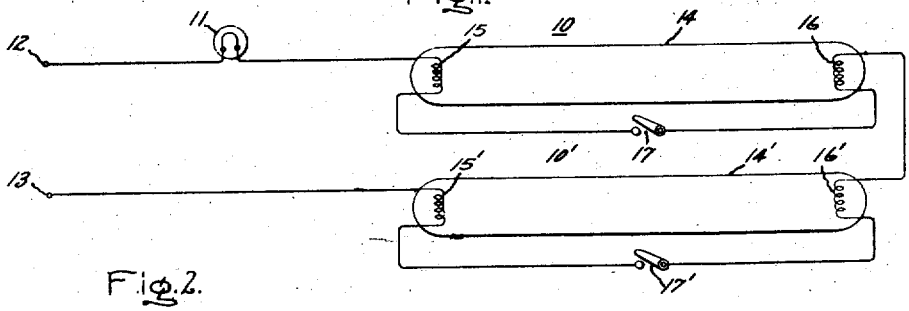

My invention relates to gaseous electric discharge devices generally, and more particularly to circuit arrangements for starting and operating such devices. Still more particularly, my invention relates to circuit arrangements comprising two or more such devices.

One of the objects of my invention is to provide a starting and operating arrangement for gaseous electric discharge devices provided with thermionic electrodes which employs a minimum of equipment and assures reliable starting together with operation at high efficiencies. Another object is to provide a simplified circuit arrangement which permits operation of the devices directly from ordinary commercial sources (115 volts, for example) of either alternating or direct current. Further objects and advantages of my invention will appear from the following description of species thereof and from the drawing.

Figure 2:
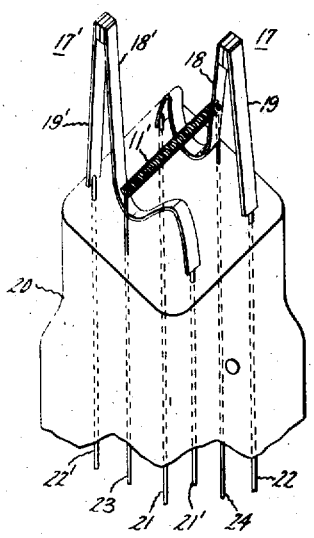
Figure 3:
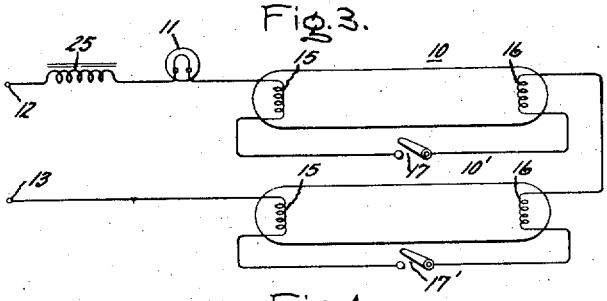
Figure 4:
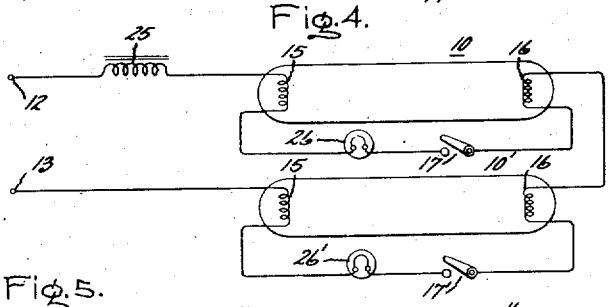
Figure 5:
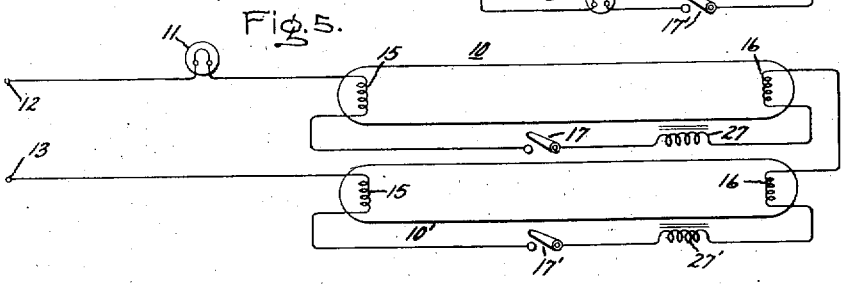

In the drawing, Fig. 1 is a diagrammatic representation of a circuit arrangement comprising my invention; Fig. 2 is a perspective view of a portion of a novel combination thermal switch and ballasting device which may, if desired, be employed in the circuit; and Figs. 3, 4 and 5 are diagrammatic representations of modified circuit arrangements included within the scope of the present invention.

Referring to Fig. 1, the circuit illustrated therein comprises a plurality (two, in this instance) of gaseous electric discharge devices 10, 10' electrically connected in series with each other and with a ballast resistance 11 across the terminals 12, 13 of a source of alternating or direct current. The devices 10, 10' may be positive column discharge lamp devices comprising the elongated tubular envelopes or containers 14, 14' having sealed into the ends thereof the thermionic electrodes 15, 16, 15', 16' each herein illustrated as consisting of a coil (preferably a coiled-coil of wire such as tungsten coated with a material of high electron emissivity, such as an alkaline earth oxide like barium or strontium oxide or mixtures thereof). If desired the said electrodes may be so designed that the voltage drop thereacross exceeds the ionizing voltage of the gaseous atmosphere so that a local arc discharge is formed thereacross during starting, as disclosed in Patent 2,103,034, G. E. Inman. The envelopes 14, 14' contain a gaseous atmosphere such as a rare gas like neon or argon, or mixtures thereof, or a vaporizable metal such as mercury, or a mixture of gas and vaporizable metal. If desired, each of the devices 10, 10' may be a low-pressure positive column lamp of the fluorescent type recently made commercially available wherein the envelope is coated internally with a suitable luminescent material and contains a filling of rare gas, preferably argon, at a low pressure of the order of 1–10 mm. of Hg, preferably about 4 mm., and a small quantity of mercury. The ballast resistance 11 may, as illustrated, consist of an incandescent tungsten filament lamp.

In accordance with my invention, the lamps 10, 10' are initially shunted by the switches 17, 17' which may be of any suitable type, either manually or automatically operable and when the lamp electrodes becomes sufficiently heated the switches 17 and 17' are opened one after the other whereby the necessary starting voltage is applied to each lamp. Several automatically operable switches are well known to the art, as exemplified, for example, by bimetallic switches and magnetic vibrator switches commercially available at the present time for use with the above-referred-to fluorescent lamps.

The following is a detailed description of an arrangement operated in accordance with the showing in Fig. 1:

Each of the lamps 10, 10' was a fluorescent lamp of the type referred to above comprising an envelope about eighteen inches long and one and one-half inches in diameter, containing argon at a pressure of about 4 mm., and a small quantity of mercury. The electrodes consisted of coiled-coils of tungsten wire coated with a mixture of barium and strontium oxides. The ballast resistance 11 was a standard commercial 100 watt, 115 volt tungsten filament incandescent lamp. The switches 17, 17' were of the thermal bimetallic type fully described in application Serial No. 228,365, filed September 3, 1938, by Leo R. Peters and assigned to the assignee of the present application, the heaters for the switches being in series with lamp 11. The current source 12, 13 was a commercial 115 volt, 60 cycle alternating current line.

In the operation of the circuit, when voltage is applied to the line the two switches 17, 17' are closed and current flows through the cathodes of both lamps thereby heating them, the said cathodes and ballast lamp 11 all being connected in series across the line terminals 12, 13, as will be apparent from an inspection of Fig. 1. For convenience in explaining the operation, let it be assumed that switch 17 opens first. When said switch 17 opens, the current flowing through the series circuit is suddenly reduced to zero and with it the voltage drop across the ballast lamp 11 likewise reduces. Thus, the full line voltage is applied to lamp 10 causing an arc discharge to strike therein between its electrodes 15, 16, and the current through the circuit momentarily increases due to the negative resistance coefficient of the lamp 10. This action further raises the temperature of the electrodes 15', 16' of lamp 10' and effectively reduces its required starting voltage. Thus when switch 17' opens, the lamp 10' starts, in this case, at approximately 60 per cent of its normal starting voltage. (This explanation also holds for direct current operation.) With both lamps 10 and 10' operating, the lamp 11 acts as a ballast to limit the current flowing in the circuit. When the line voltage is low, the resistance of the ballast lamp 11 is automatically decreased and as the voltage rises, the resistance increases, thus affording an automatic regulation of current over wide voltage ranges.

The following is a table of measurements taken during operation of the above lamps:

| Lamp | Line volts | Line amps. | Line watts | Lamp watts | Ballast watts | Lamp power factor | Overall power factor | Lamp volts |
|---|---|---|---|---|---|---|---|---|
| 10 | 110 | .31 | 31.4 | 12.0 | 6.0 | 84.0 | 92.0 | 45.0 |
| 10' | | | | 11.4 | | 82.0 | | 45.0 |
| 10 | 118 | .36 | 40 | 14.0 | 13.0 | 84.0 | 84.0 | 45.0 |
| 10' | | | | 13.0 | | 82.0 | | 44.0 |
| 10 | 125 | .40 | 48 | 18.0 | 17.5 | 87.0 | 88.0 | 44.0 |
| 10' | | | | 14.5 | | 86.0 | | 44.0 |

From the above table it will be seen that with my invention the percentage of the line voltage absorbed by the two lamps in series is materially greater than one-half and is materially greater than the percentage of the line voltage absorbed by the ballast. Thus with a line voltage of 110 the combined lamp voltage is 90 or approximately 82% of the line voltage, leaving approximately 18% of the line voltage as that absorbed by the ballast; with a line voltage of 118 the combined lamp voltage is 89 or approximately 75% of the line voltage leaving approximately 25% of the line voltage as that absorbed by the ballast; and with a line voltage of 125 the combined lamp voltage is 88 or approximately 70% of the line voltage, leaving approximately 30% of the line voltage as that absorbed by the ballast.

The voltage drop across the lamps 10, 10' gradually increases as the line voltage decreases. At 100 line volts, the total lamp drop was 95 volts. The lamps will no longer be maintained in operation at line voltage below 100, but will start at 100 volts. Thus, ballasting can be obtained with this circuit with a difference between line and lamp volts of only five per cent.

It will be obvious that more than two lamps may be operated on this circuit, the limiting factors being lamp and line volts. It is necessary, of course, that the combined voltage drops of the lamps during operation do not exceed the line or source voltage. However, in the example specifically illustrated above, the starting voltage of each of the lamps is about 100 to 120 volts, depending to a large extent upon how hot the cathodes are heated and therein lies an important advantage of this circuit. Although, the starting voltage of each lamp must be less than the line voltage, the combined starting voltages may be considerably higher (in the example nearly twice as high). Thus it is possible to start and operate a plurality of lamps whose combined starting voltages are greatly in excess of the line voltage, whereas a similar circuit employing a single lamp whose starting voltage was higher than the line voltage would be inoperative.

In place of thermal switches of the type disclosed in the above-mentioned Peters application, glow-type thermal switches of the type disclosed in application Serial No. 289,897, filed August 12, 1939, by W. C. Smitley, may be employed. In this case one of the switches is shunted by a high resistance (2,000 ohms, for example) since the switch contacts are normally open. To duplicate the results given above, a 75 watt lamp is used at 11.

In Fig. 2 is shown a combined switch and ballast unit which may be employed in the Fig. 1 circuit to combine in one small unit the switches 17 and 17' and the ballast 11. Each of the switches 17, 17' comprises a duplicate pair of bimetallic strips 18, 19 and 18', 19' respectively, the curved strips 18, 18' being actuated by a single heater or filament 11' which corresponds to the ballast lamp 11 of Fig. 1. The said switches 17, 17', as illustrated, are each of the type disclosed and claimed in application Serial No. 228,365, filed September 3, 1938, by Leo R. Peters and assigned to the assignee of the present application. The said bimetallic elements 18, 19 and 18', 19' and heater 11' are supported from a glass stem 20, and are sealed in a glass or metal bulb or envelope (not shown) filled with a suitable gas, such as helium or hydrogen, and preferably carrying a base (not shown), such as the type employed on radio tubes and having six prong contacts thereon. The respective prongs are connected by conductors 21, 22 to elements 18, 19 respectively, of switch 17; by conductors 21', 22' to elements 18', 19' respectively, of switch 17'; and by conductors 23, 24 to opposite ends of the heater 11'. The connections in this case are the same as those shown in Fig. 1. That is, the conductors 21, 22 to switch 17 are connected across the cathodes 15, 16 of lamp 10; the conductors 21', 22' to switch 17' are connected across the cathodes 15, 16 of lamp 10'; and the conductors 23, 24 to heater 11' are connected between the terminal 12 and cathode 15 of the lamp 10. The operation of the Fig. 1 circuit containing the device shown in Fig. 2 is precisely as described above.

The device shown in Fig. 2 has the advantages that it makes possible the operation of two or more lamps from one auxiliary the size of a small radio tube, it will operate on either alternating or direct current, it assures a high overall power factor because resistance is the only element in the ballast, and it is noiseless in operation.

The circuits shown in Figs. 3–5 represent modifications which may be made in certain cases to take care of such things as changes in voltage, wave shape and lamp length.

Referring to Fig. 3, the circuit illustrated therein is a modification of the Fig. 1 circuit in the insertion of an inductance or choke coil 25 in series with lamps 10 and 10′ in addition to the ballast resistance or lamp 11. The source 12, 13 may, as in Fig. 1, be alternating or direct current. The purpose of the inductance 25 is to provide a partial ballast of the lamps which effectively reduces the watts loss over a pure resistance ballast as shown in Fig. 1. Such an addition of reactance to the circuit may be necessary in the operation of some discharge lamps and will improve the current and voltage wave shapes.

In the Fig. 4 circuit, designed for operation from a source 12, 13 of alternating current, inductance 25 is substituted as the ballast for resistance 11 of Fig. 1, and resistances or lamps 26, 26′ are inserted in series with the switches 17, 17′ respectively, across lamps 10 and 10′. In some cases where the line voltage is considerably higher than 115 volts, as for example 220 volts, and the cathodes 15, 16 are of the same resistance as those in the Fig. 1 lamps, it will be necessary to place such resistances 26 and 26′ in series with the switches to control the flow of current during the starting cycle. After the lamps 10 and 10′ have started, switches 17 and 17′ are open and the resistances 26 and 26′ are out of the circuit. The ballast need not be a single choke as shown at 25, but may be a pure resistance or lamp ballast as shown in Fig. 1, or a combination of the two as in Fig. 3.

The Fig. 5 circuit is like that shown in Fig. 1 except that inductances or choke coils 27, 27′ are inserted in series with the switches 17, 17′, respectively, across lamps 10 and 10′. This arrangement is particularly effective where the starting voltages of the lamps 10 and 10′ are higher than those of the lamps in Fig. 1, the choke coils serving to produce a voltage surge when the switches 17 and 17′ are opened so as to start the lamps. This circuit is also effective for starting a single lamp 10 or 10′ whose starting voltage is higher than that of either lamp 10 or 10′ of Fig. 1, but whose operating voltage is about the same as the combined operating voltages of lamps 10 and 10′ of Fig. 1.

While I have shown and described above certain forms of my invention, it will be obvious to those skilled in the art that various changes may be made therein without departing from the spirit of the present invention. If desired, the directly heated electrodes 15, 16 may be replaced by indirectly heated electrodes wherein the said coils 15, 16 serve as heaters for a surrounding metal (nickel) tube which is electrically connected at one end to one end of the said heater, and is coated with electron emissive material. Moreover, for operation from a source of direct current, only one of the electrodes 15 or 16 need be a thermionic electrode.

What I claim as new and desire to secure by Letters Patent of the United States is:

1. In combination, a plurality of gaseous electric discharge devices having therein spaced electrodes, one electrode at least in each device being thermionic and adapted to be heated by the passage of current therethrough prior to the starting of the device, ballasting means having a positive nonlinear resistance temperature characteristic and having low heat inertia, means connecting said devices and ballasting means in a series circuit, and a time delay starting switch for each of said devices each switch being connected across one of said devices and in series with the thermionic electrode thereof, and means for causing said switches to open successively.

2. In combination a plurality of gaseous electric discharge lamps each having an electrode at each end thereof adapted to be heated by the passage of current therethrough prior to the starting of a discharge in the lamp, ballasting means comprising a resistor having a positive nonlinear resistance temperature characteristic and having low heat inertia, means connecting said ballasting means and said lamps in a series circuit, a plurality of starting switches one for each of said lamps each switch being connected across its respective lamp and in series with the electrodes thereof, and means by which said switches are opened in succession and with a time delay after the energization of said circuit.

3. In combination a plurality of gaseous electric discharge lamps each having an electrode at each end thereof adapted to be heated by the passage of current therethrough prior to the starting of a discharge in the lamp, ballasting means comprising a tungsten filament incandescent lamp, means connecting said ballasting means and said lamps in a series circuit, a plurality of starting switches one for each of said lamps each switch being connected across its respective lamp and in series with the electrodes thereof, and means by which said switches are opened in succession and with a time delay after the energization of said circuit.

4. In combination, a plurality of electric discharge devices having therein spaced electrodes adapted to be heated by the passage of current therethrough prior to the starting of the device, ballast for said devices, means connecting said ballast and said electrodes in a series circuit, and a starting switch having a plurality of pairs of contacts, each pair being connected to interrupt said series circuit between the electrodes of a separate device, said switch having common operating means for said pairs of contacts constructed to operate them in sequence.

5. In combination, a plurality of electric discharge devices having therein spaced electrodes adapted to be heated by the passage of current therethrough prior to the starting of the device, a ballasting resistor, means connecting said resistor, said devices and the electrodes thereof in a series circuit, and a multiple switch having one pair of contacts connected to interrupt said series circuit between the electrodes of one device, and having another pair of contacts connected to interrupt said series circuit between the electrodes of the other device, and a single member operative to cause said pairs of contacts to open in sequence.

6. In combination, a plurality of electric discharge devices having therein spaced electrodes, one electrode at least of each device being thermionic and adapted to be heated by the flow of current therethrough prior to the starting of the device, a ballast, means for connecting said devices and said ballast in series across a source of current supply, a plurality of starting switches each connected to shunt one of said devices and to control the flow of current through the thermionic electrode thereof, the sum of the arc-drop voltages of said devices being materially greater than one-half of the voltage of said source, and means operative to open said switches successively.

7. In combination, a plurality of electric discharge devices having therein spaced electrodes adapted to be heated by the flow of current therethrough prior to the starting of the devices, a ballast, means for connecting said devices and said ballast in series across a source of current supply, a plurality of starting switches each connected to shunt one of said devices and to control the flow of current through the electrodes thereof, the sum of the arc-drop voltages of said devices being of the order of 75% of the value of the voltage supplied by said source, and means operative to open said switches successively.

8. In combination, a plurality of electric discharge devices having therein spaced electrodes adapted to be heated by the flow of current therethrough prior to the starting of the devices, a ballast, means for connecting said devices and said ballast in series across a source of current supply, a plurality of starting switches each connected to shunt one of said devices and to control the flow of current through the electrodes thereof, the percentage of the source voltage absorbed by said devices being at least twice the percentage of the source voltage absorbed by said ballast, and means operative to open said switches successively.

9. In combination, a plurality of electric discharge devices having therein spaced electrodes adapted to be heated by the flow of current therethrough prior to the starting of the devices, a ballast including reactive means, means for connecting said devices and said ballast in series across a source of current supply, a plurality of starting switches each connected to shunt one of said devices and to control the flow of current through the electrodes thereof, the percentage of the source voltage absorbed by said devices being of the order of four times the percentage of the source voltage absorbed by said ballast, and means operative to open said switches at different times.

JOHN H. CAMPBELL.